United States Patent
Tamura et al.

(10) Patent No.: US 7,592,099 B2
(45) Date of Patent: Sep. 22, 2009

(54) ELECTRODE FOR A LITHIUM SECONDARY BATTERY HAVING A THIN FILM ACTIVE MATERIAL WITH COLUMNAR OR INSULAR STRUCTURES AND LITHIUM SECONDARY BATTERY

(75) Inventors: Noriyuki Tamura, Kobe (JP); Yoshio Kato, Kobe (JP); Shigeki Matsuta, Kobe (JP); Maruo Kamino, Tokushima (JP)

(73) Assignee: Sanyo Electric Co., Ltd., Osaka (JP)

( * ) Notice: Subject to any disclaimer, the term of this patent is extended or adjusted under 35 U.S.C. 154(b) by 928 days.

(21) Appl. No.: 10/878,965

(22) Filed: Jun. 29, 2004

(65) Prior Publication Data
US 2004/0265697 A1    Dec. 30, 2004

(30) Foreign Application Priority Data
Jun. 30, 2003  (JP) ............................ 2003-187452

(51) Int. Cl.
*H01M 4/58*  (2006.01)
*H01M 4/66*  (2006.01)

(52) U.S. Cl. .................................. 429/218.1; 429/245
(58) Field of Classification Search ............... 429/128, 429/218.1, 245
See application file for complete search history.

(56) References Cited
U.S. PATENT DOCUMENTS

| | | | | |
|---|---|---|---|---|
| 6,051,340 A | 4/2000 | Kawakami et al. | ..... | 429/231.95 |
| 6,203,944 B1* | 3/2001 | Turner et al. | ............. | 429/218.1 |
| 6,746,801 B2* | 6/2004 | Tamura et al. | .............. | 429/245 |
| 6,746,802 B2* | 6/2004 | Tamura et al. | .............. | 429/245 |
| 2002/0086215 A1* | 7/2002 | Tamura et al. | .............. | 429/245 |

FOREIGN PATENT DOCUMENTS

| | | | |
|---|---|---|---|
| JP | 2002-151056 A | * | 5/2002 |
| WO | 02/25757 A1 | | 3/2002 |

OTHER PUBLICATIONS

Boukamp, B.A. et al., "All-Solid Lithium Electrodes with Mixed-Conductor Matrix", *Electrochemical Science and Technology*, vol. 128, No. 4, pp. 725-729 (Apr. 1981).

* cited by examiner

*Primary Examiner*—Mark Ruthkosky
(74) *Attorney, Agent, or Firm*—Kubovcik & Kubovcik

(57) ABSTRACT

An electrode for a lithium secondary battery includes a thin film of an active material having a first phase that reacts with Li dominantly and a second phase that reacts less readily with Li than the first phase and exists at least before initial-cycle charging and after discharging in each cycle following the initial cycle. A surface of the current collector has an arithmetical mean roughness Ra of 0.1 μm or greater. A surface of the thin film has irregularities formed corresponding to the irregularities of the current collector surface. By the charging and discharging in the initial cycle and thereafter, gaps form along the thin-film thickness on lines connecting valleys in the thin-film surface irregularities and valleys in the current-collector surface irregularities, and the thin film is divided into columnar or insular structures by the gaps.

18 Claims, 5 Drawing Sheets

ELECTRODE FOR A LITHIUM SECONDARY BATTERY HAVING A THIN FILM ACTIVE MATERIAL WITH COLUMNAR OR INSULAR STRUCTURES AND LITHIUM SECONDARY BATTERY

BACKGROUND OF THE INVENTION

1. Field of the Invention

The present invention relates to electrodes for lithium secondary batteries and lithium secondary batteries using the electrodes.

2. Description of Related Art

The group IV elements of the periodic table, such as Sn, are capable of intercalating and deintercalating Li by electrochemically reacting with Li. For this reason, use of the group IV elements for an active material for lithium secondary batteries has been researched, and it is known that such batteries have remarkably large theoretical capacities. However, a problem with active materials made of the group IV elements has been that they tend to become granulated and pulverized into fine powder with repeated charging and discharging, and peel off from the current collector, resulting in poor cycle performance.

The present applicant has found that good cycle performance is obtained with an electrode in which an alloy thin film composed of a metal that can be alloyed with Li, such as Sn, and a metal that cannot be alloyed with Li, such as Co, is formed on a current collector having an arithmetical mean roughness Ra of 0.1 μm or greater. (See International Publication No. WO 02/25757.) In this electrode, the thin film of the active material is divided into insular structures by the charge-discharge reaction, preventing pulverization of the thin film and thus improving cycle performance.

However, there is a demand for further improvement in the cycle performance of the above-noted electrode.

BRIEF SUMMARY OF THE INVENTION

It is an object of the present invention to provide an electrode for a lithium secondary battery in which a thin film of an active material that alloys with Li is formed on a current collector made of a metal that does not alloy with Li, the electrode having good cycle performance, and to provide a lithium secondary battery using the same.

Accordingly, the present invention provides an electrode for a lithium secondary battery, comprising: a current collector composed of a metal that does not alloy with Li, said current collector superficially having irregularities (or peaks and valleys) having an arithmetical mean roughness Ra of 0.1 μm or greater; and a thin film, provided on the current collector, of an active material that alloys with Li, said thin film superficially having irregularities formed corresponding to the current-collector surface irregularities, and having a first phase that reacts with Li dominantly and a second phase that reacts less readily with Li than the first phase, i.e., the first phase reacts with Li to a greater extent than the second phase, the second phase existing at least before initial-cycle charging and after discharging of the electrode in each cycle following the initial cycle; wherein by the charging and discharging in the initial cycle and thereafter, gaps dividing the thin film into columnar or insular structures form along the thin-film thickness on lines connecting valleys in the thin-film surface irregularities and valleys in the current-collector surface irregularities.

In the present invention, the active material has a first phase that reacts with Li dominantly and a second phase that less readily reacts with Li than the first phase, and the second phase exists at least before the initial charging and after the discharging in each cycle following the initial charging. It is believed that because the active material has the two phases, i.e., the first phase and the second phase, well-defined columnar or insular structures are formed in a thin film of the invention in the initial charging and discharging, and consequently, cycle performance is improved. As will be discussed later, good cycle performance cannot be obtained if the second phase does not exist before the initial charging but is formed in a charging and discharging cycle following the initial charging and discharging. Therefore, it is important that the second phase exist before the initial charging.

In the present invention, a surface of the current collector has an arithmetical mean roughness Ra of 0.1 μm or greater, and preferably in the range of 0.1 μm to 2 μm. Arithmetical mean roughness Ra is defined in Japanese Industrial Standard (JIS) B 0601-1994, and it can be measured by, for example, a surface roughness meter.

In the present invention, a surface of the thin film has irregularities corresponding to the irregularities in the surface of the current collector, and by the charging and discharging in the initial cycle and thereafter, gaps (cuts) form along the thin-film thickness on lines connecting valleys of the irregularities in the thin film surface and valleys of irregularities in the surface of the current collector, dividing the thin film into columnar or insular structures. Since the thin film is divided into columnar or insular structures, voids are formed surrounding the columnar portions or insular portions. The voids can absorb changes in the volume of the active material that expands and contracts during charging and discharging. This controls the occurrence of stress in the thin film and prevents the thin film from pulverizing and peeling off from the current collector. The use of the current collector having an arithmetical mean surface roughness Ra of 0.1 μm or greater as described above makes it possible to form large irregularities in the thin film surface, resulting in well-formed columnar or insular structures. In the present invention, the term "insular" refers to a configuration in which a plurality of peaks in the thin film are grouped together without being separated by gaps, i.e., an island-type structure comprising a plurality of peaks.

In one embodiment of the invention, the current collector contains a metal that does not alloy with Li. The metal that does not alloy with Li means a metal that does not form a solid solution with Li, and specifically, a metal that does not have an alloy phase in the binary alloy phase diagram with Li. Examples of the metal that does not alloy with Li include Cu, Fe, Ni, Co, Mo, W, and Ta. When the current collector is formed of Cu or a Cu alloy, a copper foil or a copper alloy foil may be used. Examples of the copper foil or copper alloy foil having an arithmetical mean roughness Ra of 0.1 μm or greater as described above include a rolled copper foil and a rolled copper alloy foil as well as an electrolytic copper foil and an electrolytic copper alloy foil the surfaces of which are roughened.

The active material of the electrode of the present invention contains, as its main component, a component that alloys with Li. Examples of the component that alloys with Li include the group IV elements in the periodic table, such as Sn, Si, and Ge. Among them, Sn is particularly preferable as the component that alloys with Li in one embodiment of the invention. In addition, it is preferable that the active material in one embodiment of the invention contain a component that does not alloy with Li. Transition metals are preferable as such a component. Among the transition metals, iron group elements (Fe, Co, and Ni) are preferable, and especially preferable is Co. A preferable amount of the transition element contained in the thin film is 5 to 25 atom %. By restricting the amount of the transition element within this range, it becomes easy to form a thin film of the active material in which the second phase exists before the initial charging. In the case of Sn—Co alloy, in which the component that alloys with Li is Sn and the transition metal is Co, a Co content range of 5 atom % to 25 atom % corresponds to 3 wt. % to 15 wt. %. If the content of Co exceeds 25 atom %, the amount of transition metal element is too large, and the alloy becomes close to the stoichiometric composition of the intermetallic compound $CoSn_2$. As a result, the amount of the formed second phase, which less easily reacts with lithium, tends to be too large, or the first and second phases tend to form a single amorphous phase.

In the present invention, due to the fact that the second phase exists in the thin film of the active material before the initial charging and discharging, the thin film of the active material is provided with appropriate ductility and brittleness. Specifically, in the thin film of the active material, there exist regions in which the density is relatively low on the lines connecting valleys of irregularities in the thin film surface and valleys of irregularities in the surface of the current collector; charging and discharging cause a stress to concentrate in these regions, consequently forming the gaps therein. If the active material is imparted with appropriate ductility and brittleness as described above, the gaps are not easily formed in regions other than the above-described regions. Thus, gaps form along the thin-film thickness on the lines connecting the valleys of the irregularities in the thin film surface and the valleys of the irregularities in the surface of the current collector, and good columnar or insular (island) structures are formed.

In the electrode of the present invention, it is preferable that the second phase exist also after the initial charging. The second phase in the present invention may disappear when the depth of charge is set large in the charging during a cycle after the initial charging, as will be discussed later.

Further, it is preferable that the second phase contain a constituent element of the first phase. It is also preferable that the second phase contain a transition element. When the thin film of the active material contains Sn and Co, it is preferable that the second phase contain Sn and Co. When the second phase contains Sn and Co, it is preferable that the second phase show crystal peaks at 20° to 36° and/or 40° to 45° in the X-ray diffraction pattern using CuKa radiation.

In the present invention, it is also preferable that the first phase be amorphous or microcrystalline. This can reduce stress forces within the first phase and stress forces at the interface between the first phase and the second phase, further suppressing pulverization of the active material. Moreover, if the second phase contains a constituent element of the first phase, it is possible to further relax the stress at the interface between the first phase and the second phase, and to suppress the pulverization further.

In the present invention, electroplating may be used to provide an active material in a thin film state on the current collector. The thin film may also be formed by methods other than electroplating, for example, by a chemical thin-film formation method such as electroless plating and CVD, or by a physical thin-film formation method such as sputtering, vacuum deposition, and thermal spraying.

A lithium secondary battery according to the present invention may include a negative electrode constituted from an electrode of the invention as set forth above, a positive electrode, and a non-aqueous electrolyte.

The active material of the positive electrode usable for the present invention is not particularly limited as long as the active material can intercalate and deintercalate lithium, and a variety of active materials that have conventionally been used as the positive electrode active material for lithium secondary batteries may be used. For example, it is possible to use a lithium transition metal oxide employing at least one transition metal such as cobalt, nickel, and manganese.

The solvent of the non-aqueous electrolyte used in the present invention may be any solvent that has conventionally been used as a solvent for an electrolyte in lithium secondary batteries. Among them, a mixed solvent of cyclic carbonate and chain carbonate is particularly preferable. Examples of the cyclic carbonate include ethylene carbonate, propylene carbonate, butylene carbonate, and vinylene carbonate. Examples of the chain carbonate include dimethyl carbonate, methylethyl carbonate, and diethyl carbonate. It is preferable that the mixing ratio of the cyclic carbonate and chain carbonate be in the volume ratio range of 1:4 to 4:1 (cyclic carbonate: chain carbonate).

In the present invention, the solute of the non-aqueous electrolyte may be any lithium salt that is generally used as a solute in lithium secondary batteries. Examples of such a lithium salt include $LiPF_6$, $LiBF_4$, $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $LiAsF_6$, $LiClO_4$, $Li_2B_{10}Cl_{10}$, $Li_2B_{12}Cl_{12}$, and mixtures thereof.

DETAILED DESCRIPTION OF THE PREFERRED EMBODIMENTS

Figure 1:
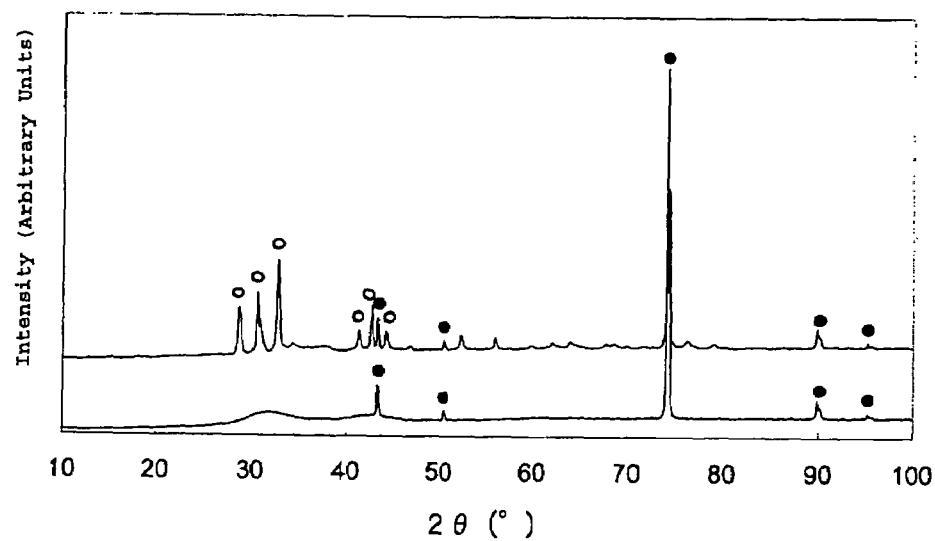
FIG. 1 illustrates X-ray diffraction patterns of the electrodes of Example 1 and Comparative Example 1 after film formation.

Hereinbelow, preferred embodiments of the present invention are described by way of examples thereof. It should be construed, however, that the present invention is not limited to the following examples, but various changes and modifications are possible unless such changes and variations depart from the scope of the invention.

Preparation of Electrode

A 2 μm thick Sn—Co alloy film was formed on a 18 μm-thick electrolytic copper foil (arithmetical mean surface roughness Ra=0.7 μm) by electroplating and thereafter dried. Thus, electrodes of Example 1 and Comparative Example 1 were prepared. The plating baths used had the compositions as shown in the following Table 1. The current density in the electroplating was 1 A/dm2. In Table 1, EBALOY SNC #1 and EBALOY SNC #2 are trade names of addition agents made by Ebara Udylite Co., Ltd.

TABLE 1

| Component | Example 1 | Comparative Example 1 |
| --- | --- | --- |
| Stannous pyrophosphate | 50 g/L | 20 g/L |
| Cobalt chloride | 9 g/L | 20 g/L |
| Potassium pyrophosphate | 250 g/L | 250 g/L |
| EBALOY SNC #1 | 100 ml/L | 100 ml/L |
| EBALOY SNC #2 | 10 ml/L | 10 ml/L |

The composition of the thin film formed on the current collector was quantified by ICP emission spectroscopy. The thin film of Example 1 had 92 wt. % of Sn and 8 wt. % of Co. The thin film of Comparative Example 1 had 80 wt. % of Sn and 20 wt. % of Co.

Preparation of Electrolyte Solution $LiPF_6$ was dissolved at a concentration of 1 mole/liter into a mixed solvent in which ethylene carbonate and dimethyl carbonate are mixed at a volume ratio of 1:1, and an electrolyte solution was thus prepared.

Cycle Test

Using as working electrodes pieces of the electrodes of Example 1 and Comparative Example 1 that were cut into a size of 2 cm×2 cm, three-electrode beaker cells were prepared. Metallic lithium was used as their counter electrodes and reference electrodes, and the above-described electrolyte solution was used as their electrolyte. Each of the cells was subjected to constant current charging at 25° C. with three-step current densities of 1 mA, 0.5 mA, and 0.2 mA until the voltage reached 0 V (vs. $Li/Li^+$), and thereafter subjected to constant current discharging with three-step current densities of 1 mA, 0.5 mA, and 0.2 mA until the voltage reached 2 V (vs. $Li/Li^+$); this procedure was taken as one cycle, and the cycle was repeated 40 times. It should be noted that reduction of the working electrode is referred to as charging and oxidation of the working electrode is referred to as discharging. Discharge capacities at the first cycle and capacity retention ratios at the 40th cycle are shown in Table 2. The capacity retention ratios at the 40th cycle were obtained by the following equation.

Capacity retention ratio at the 40th cycle (%)=(Discharge capacity at the 40th cycle)/(Discharge capacity at the first cycle)×100

TABLE 2

|  | Discharge capacity at cycle 1 | Capacity retention ratio at cycle 40 |
| --- | --- | --- |
| Example 1 | 577 mAh/g | 100% |
| Comparative | 518 mAh/g | 81% |

As apparent from the results shown in Table 2, the cell of Example 1 demonstrated a higher discharge capacity and better cycle performance than that of Comparative Example 1.

Structural Analysis

FIG. 1 illustrates X-ray diffraction (XRD) patterns of the electrodes of Example 1 (top) and Comparative Example 1 (bottom) after the film formation, that is, before the initial charging. As clearly seen from FIG. 1, the electrode of Example 1 demonstrated crystal peaks at 20° to 36° and 40° to 45° (peaks indicated by circles) which are believed to correspond to intermetallic compounds of Sn and Co. The peaks indicated by black dots originate from the copper substrate, which is the current collector.

Figure 2:
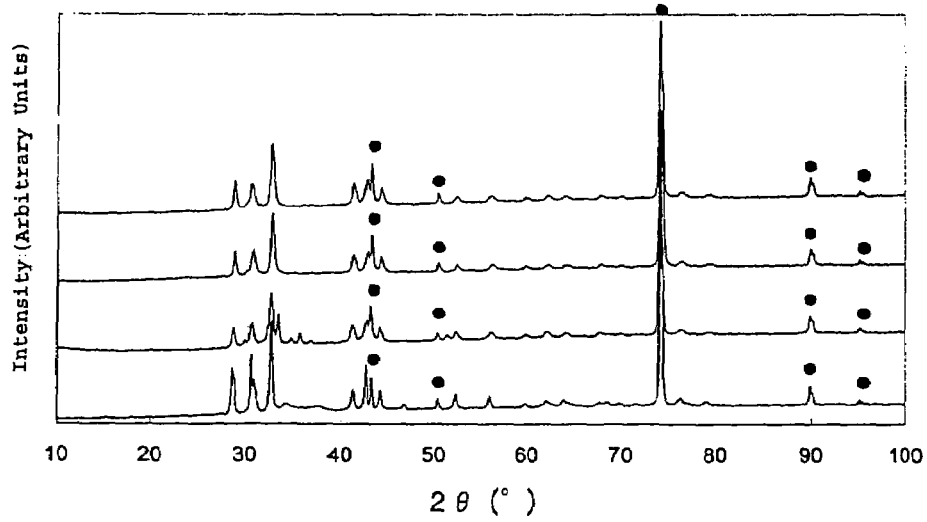
FIG. 2 illustrates X-ray diffraction patterns of the electrode of Example 1 after the film formation, after the charging in the first cycle, after the discharging in the first cycle, and after the discharging in the fifth cycle.

FIG. 2 illustrates (from top to bottom) X-ray diffraction patterns of the electrode of Example 1 after the film formation (same as FIG. 1), after the charging in the first cycle, after the discharging in the first cycle, and after the discharging in the fifth cycle. As seen from FIG. 2, the crystal phase (the second phase) represented by crystal peaks at 20° to 36° and 40° to 45° that appears to be an intermetallic compound of Sn—Co exists also after the charging in the first cycle. This indicates that this crystal phase exists without having reacted with lithium in the first cycle charging, that is, the initial charging. The discharge capacity per the weight of the thin film in the first cycle is fairly large, and this indicates that what reacts with lithium in the first cycle, or the initial cycle, is a phase that is other than the crystal phase confirmed by the X-ray diffraction pattern. It is probable that this phase is amorphous or microcrystalline since it is not confirmed by the X-ray diffraction pattern. This amorphous or microcrystalline phase corresponds to the first phase in the present invention. On the other hand, the crystal phase that is confirmed by the X-ray diffraction pattern corresponds to the second phase in the present invention.

Although not shown in FIG. 2, it has been proved that the crystal phase disappears in a state after the charging in the third cycle and thereafter. It is probable that the crystal phase, which is a phase that does not readily react with lithium, reacted with lithium and thus disappeared because the depth of charge was set large in the present example. Therefore, if the depth of charge is reduced, such a crystal phase would not disappear even in a state after the charging in each cycle.

Figure 3:
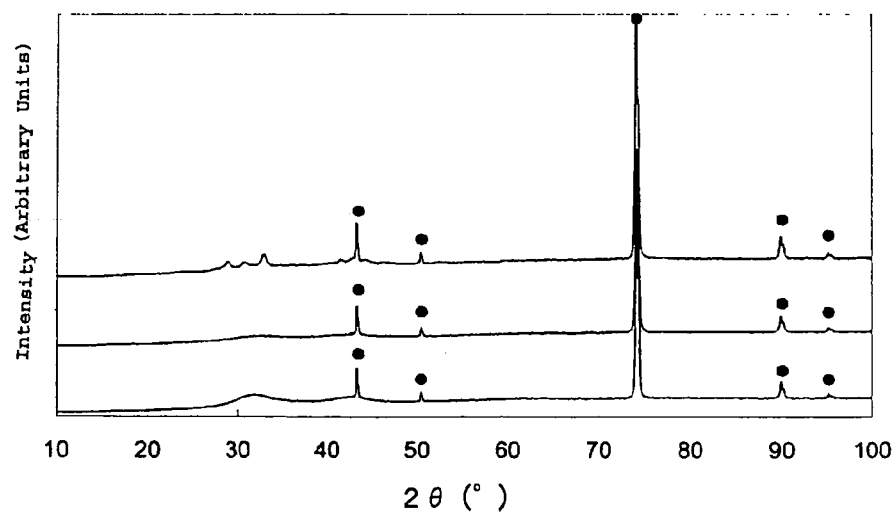
FIG. 3 illustrates X-ray diffraction patterns of the electrode of Comparative Example 1 after the film formation, after the discharging in the first cycle, and after the discharging in the 10th cycle.

FIG. 3 illustrates (from top to bottom) X-ray diffraction patterns of the electrode of Comparative Example 1 after the film formation (i.e., before the charging in the first cycle), after the discharging in the first cycle, and after the discharging in the 10th cycle. As clearly seen from FIG. 3, the electrode of Comparative Example 1 does not show peaks of the crystal phase as demonstrated by Example 1 before the initial charging (in the first cycle) and after the initial discharging (in the first cycle). Nevertheless, after the 10th cycle and thereafter the peaks of the crystal phase similar to those in Example 1 are confirmed, though slight, in the state after the discharging. This fact demonstrates that the crystal phase, that is, the second phase, needs to exists in the state after the film formation, or in other words, before the initial charging, to improve cycle performance. That is, by the fact that the crystal phase exists before the initial charging, it is possible to form good columnar or insular structures by the initial charging and discharging.

Figure 6:
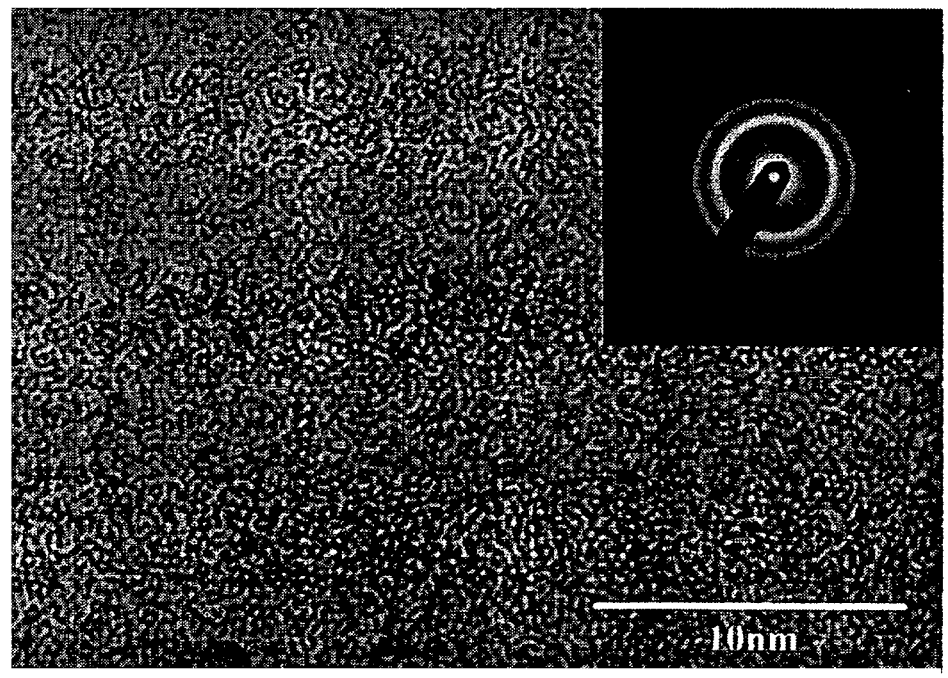
FIG. 6 illustrates a TEM photograph and an electron diffraction pattern of the electrode of Comparative Example 1 after the film formation.

FIG. 6 illustrates a transmission electron microscope (TEM) photograph (2000000×) and an electron diffraction pattern of the electrode of Comparative Example 1. The X-ray diffraction pattern in FIG. 3 did not show crystal peaks, and FIG. 6 clearly shows that images originating from crystals do not exist and that just one phase exists in the thin film of Comparative Example 1. Accordingly, it is understood that the thin film of Comparative Example 1 has only an amorphous phase.

Figure 4:
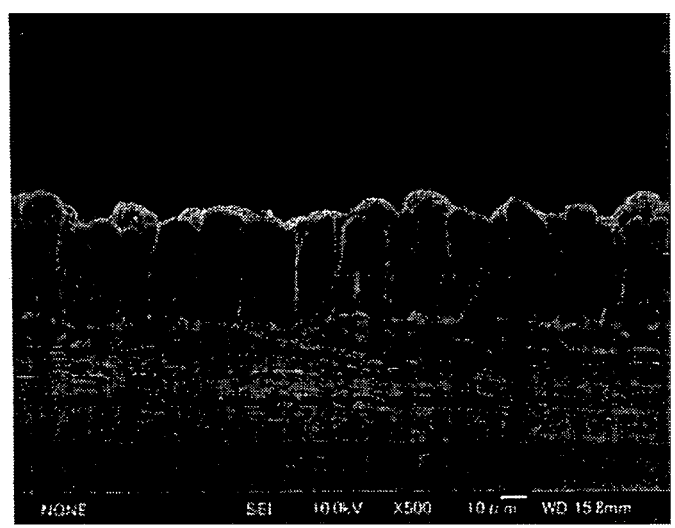
FIG. 4 is a SEM photograph illustrating a cross section of the electrode of Example 1 after the 40th cycle.
Figure 5:
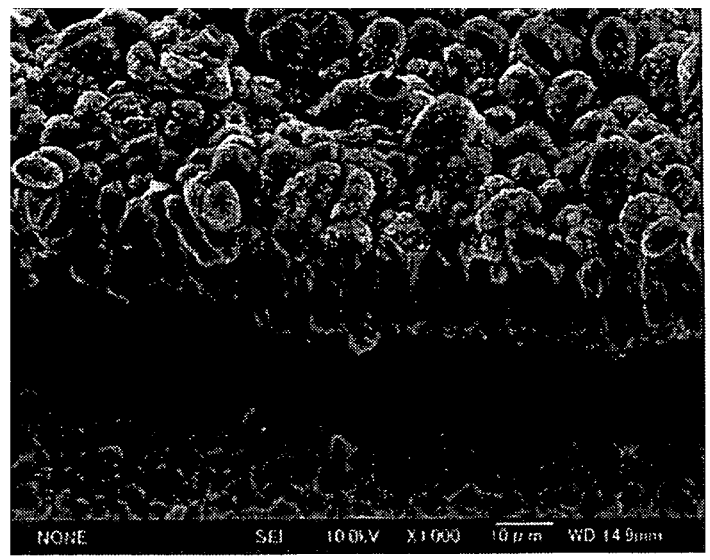
FIG. 5 is a SEM photograph illustrating a cross section of the electrode of Comparative Example 1 after the 40th cycle.

FIG. 4 is a scanning electron microscope (SEM) photograph (500×) illustrating a cross section of the electrode of Example 1 after the 40th cycle. FIG. 5 is a scanning electron microscope (SEM) photograph (1000×) illustrating a cross section of the electrode of Comparative Example 1 after the 40th cycle. FIG. 4 clearly shows that good columnar or insular structures are formed in the electrode of Example 1 and these structures are closely adhered to the current collector. It is understood that in the electrode of Comparative Example 1 shown in FIG. 5, good columnar or insular structures are not formed and the thin film has peeled off from the current collector. It should be noted that although FIG. 5 depicts a portion in which the thin film has peeled off from the current collector, the thin film has not entirely peeled off but is partially in contact with the current collector.

Figure 7:
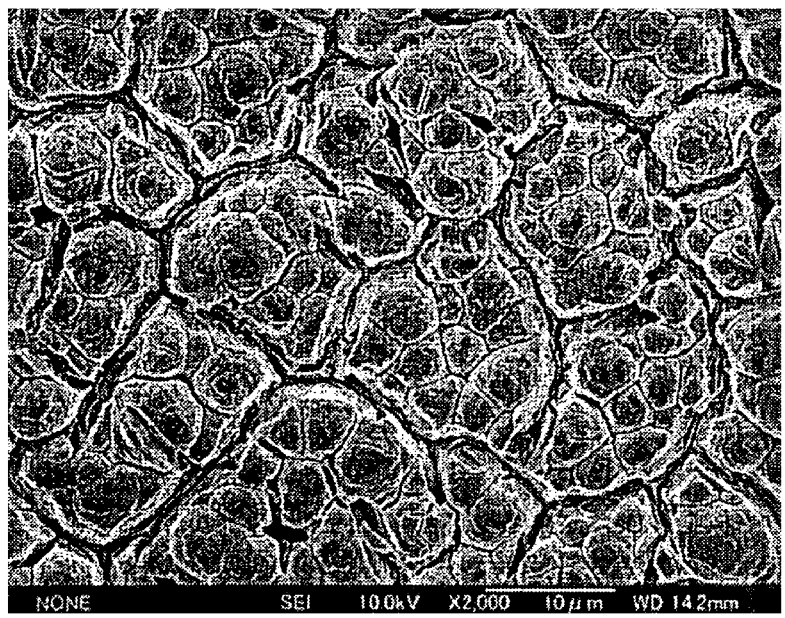
FIG. 7 is a SEM photograph illustrating a thin film surface of the electrode of Example 1 after the charging and discharging in the first cycle (initial cycle)
Figure 8:
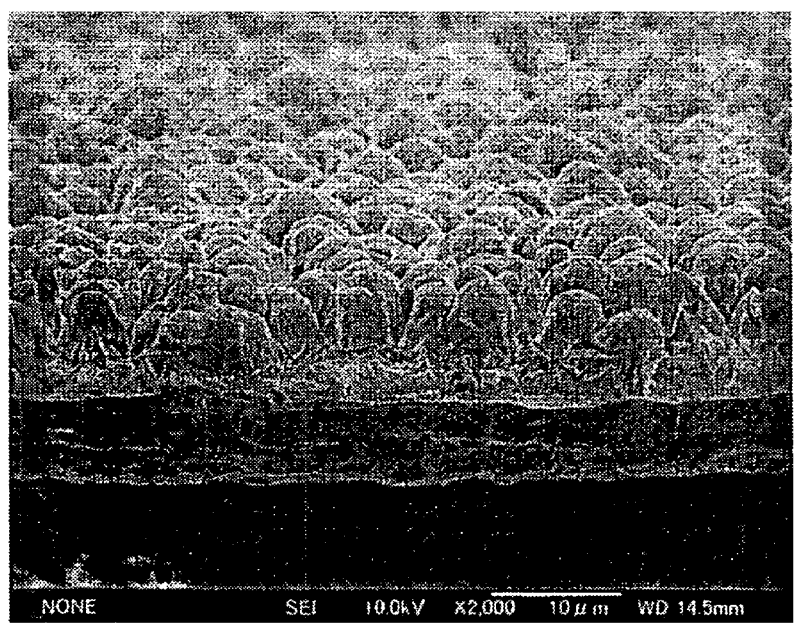
FIG. 8 is a SEM photograph illustrating a cross section of the electrode of Example 1 after the charging and discharging in the first cycle (initial cycle)

FIGS. 7 and 8 are SEM photographs (2000×) illustrating the electrode of Example 1 after the charging and discharging in the first cycle (the initial cycle). FIG. 7 illustrates the surface of the thin film viewed from above, and FIG. 8 illustrates a cross section of the electrode.

Figure 9:
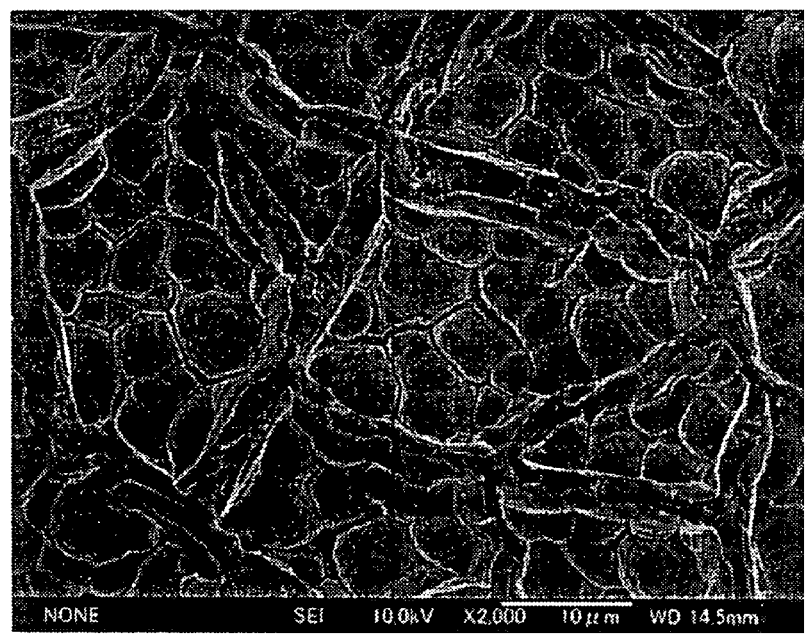
FIG. 9 is a SEM photograph illustrating a thin film surface of the electrode of Comparative Example 1 after the charging and discharging in the first cycle (initial cycle)
Figure 10:
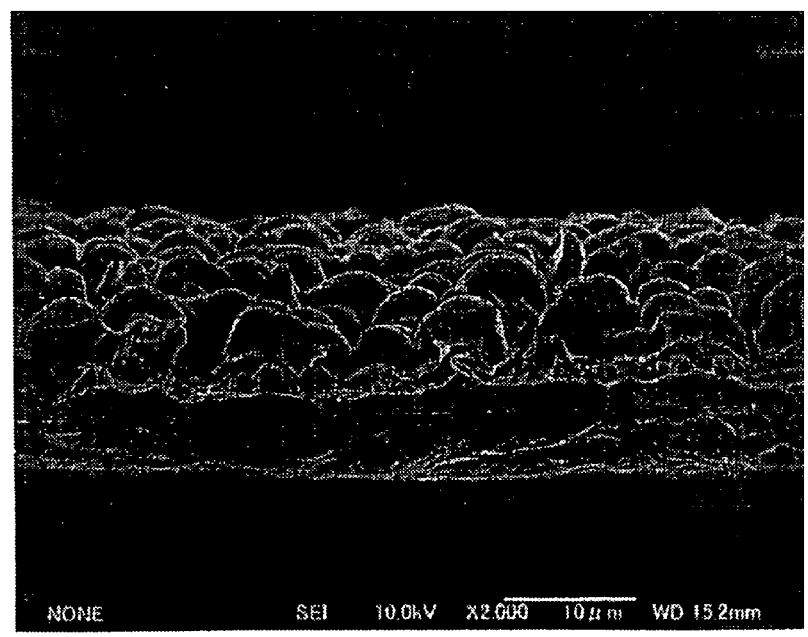
FIG. 10 is a SEM photograph illustrating a cross section of the electrode of Comparative Example 1 after the charging and discharging in the first cycle (initial cycle).

FIGS. 9 and 10 are SEM photographs (2000×) illustrating the electrode of Comparative Example 1 after the charging and discharging in the first cycle (the initial cycle). FIG. 9 illustrates the surface of the thin film viewed from above, and FIG. 10 illustrates a cross section of the electrode.

As is understood from the comparison between FIGS. 7 and 8, and FIGS. 9 and 10, good columnar or insular structures are formed after the initial charging and discharging in the electrode of Example 1 in accordance with the present invention. That is, gaps are formed along valleys of the irregularities in the thin film surface, and by these gaps, the columnar or insular structures are formed. In contrast, it is understood that in the electrode of Comparative Example 1 shown in FIGS. 9 and 10, the gaps are formed in a state such that the thin film is torn apart, dividing the thin film. From these facts, it is conceivable that good columnar or insular structures are formed in the electrode of the present invention in the initial charging and discharging due to the second phase existing before the initial charging.

According to the present invention, an electrode for a lithium secondary battery having good cycle performance can be obtained since good columnar or insular structures can be formed by the initial charging and discharging.

Only selected embodiments have been chosen to illustrate the present invention. To those skilled in the art, however, it will be apparent from the foregoing disclosure that various changes and modifications can be made herein without departing from the scope of the invention as defined in the appended claims. Furthermore, the foregoing description of the embodiments according to the present invention is provided for illustration only, and not for limiting the invention as defined by the appended claims and their equivalents.

What is claimed is:

1. An electrode for a lithium secondary battery, comprising:
    a current collector composed of a metal that does not alloy with Li, said current collector superficially having irregularities having an arithmetical mean roughness Ra of 0.1 μm or greater; and
    a thin film, provided on the current collector, of an active material that alloys with Li, said thin film superficially having irregularities formed corresponding to the current-collector surface irregularities, and having a first phase that reacts with Li dominantly and a second phase that reacts less readily with Li than the first phase, the second phase existing at least before initial-cycle charging and after discharging in each cycle following the initial cycle; wherein
    by the charging and discharging of the electrode in the initial cycle and thereafter, gaps dividing the thin film into columnar or insular structures form along the thin-film thickness on lines connecting valleys in the thin-film surface irregularities and valleys in the current-collector surface irregularities.

2. The electrode for a lithium secondary battery according to claim 1, wherein the second phase exists after the initial-cycle charging.

3. The electrode for a lithium secondary battery according to claim 1, wherein the first phase is amorphous or microcrystalline.

4. The electrode for a lithium secondary battery according to claim 1, wherein the second phase contains a constituent element of the first phase.

5. The electrode for a lithium secondary battery according to claim 3, wherein the second phase contains a constituent element of the first phase.

6. The electrode for a lithium secondary battery according to claim 1, wherein the first phase contains Sn as an active material.

7. The electrode for a lithium secondary battery according to claim 4, wherein the first phase contains Sn as an active material.

8. The electrode for a lithium secondary battery according to claim 5, wherein the first phase contains Sn as an active material.

9. The electrode for a lithium secondary battery according to claim 1, wherein the second phase contains a transition element.

10. The electrode for a lithium secondary battery according to claim 7, wherein the second phase contains a transition element.

11. The electrode for a lithium secondary battery according to claim 8, wherein the second phase contains a transition element.

12. The electrode for a lithium secondary battery according to claim 9, wherein the transition element is at least one element selected from the group consisting of Fe, Co, and Ni.

13. The electrode for a lithium secondary battery according to claim 6, wherein the second phase contains Sn and Co.

14. The electrode for a lithium secondary battery according to claim 9, wherein the amount of the transition element in the thin film is 5 to 25 atom %.

15. The electrode for a lithium secondary battery according to claim 8, wherein the second phase shows crystal peaks at 20° to 36° and/or 40° to 45° in an X-ray diffraction pattern using CuK α-radiation.

16. The electrode for a lithium secondary battery according to claim 1, wherein the current collector is composed of Cu or a Cu alloy.

17. The electrode for a lithium secondary battery according to claim 1, wherein the thin film is formed by electroplating.

18. A lithium secondary battery comprising, as a negative electrode, an electrode according to claim 1, a positive electrode, and a non-aqueous electrolyte.

* * * * *